(12) United States Patent
McLean et al.

(10) Patent No.: US 10,775,159 B2
(45) Date of Patent: Sep. 15, 2020

(54) METHOD AND APPARATUS FOR ILLUMINATION AND INSPECTION OF AN OBJECT IN A MACHINE VISION APPARATUS

(71) Applicant: RENISHAW PLC, Wotton-under-Edge, Gloucestershire (GB)

(72) Inventors: Calum Conner McLean, Edinburgh (GB); Timothy Charles Featherstone, Edinburgh (GB); Richard George Dewar, Peebles (GB)

(73) Assignee: RENISHAW PLC, Wotton-under-Edge (GB)

( * ) Notice: Subject to any disclaimer, the term of this patent is extended or adjusted under 35 U.S.C. 154(b) by 1064 days.

(21) Appl. No.: 14/765,200

(22) PCT Filed: Feb. 3, 2014

(86) PCT No.: PCT/GB2014/050286
§ 371 (c)(1),
(2) Date: Jul. 31, 2015

(87) PCT Pub. No.: WO2014/122438
PCT Pub. Date: Aug. 14, 2014

(65) Prior Publication Data
US 2015/0362311 A1    Dec. 17, 2015

(30) Foreign Application Priority Data

Feb. 5, 2013    (GB) .................................. 1302018.5
Dec. 6, 2013    (GB) .................................. 1321544.7

(51) Int. Cl.
*H04N 7/18*    (2006.01)
*G01N 21/88*   (2006.01)
(Continued)

(52) U.S. Cl.
CPC ..... *G01B 11/2433* (2013.01); *G01N 21/8806* (2013.01); *H04N 5/2256* (2013.01)

(58) Field of Classification Search
CPC ............. G01B 11/2433; H04N 5/2256; G01N 21/8806
(Continued)

(56) References Cited

U.S. PATENT DOCUMENTS 4,521,835 A  *  6/1985  Meggs ................... F21S 8/032
                                                             362/184
5,854,675 A     12/1998 Lessing et al.
(Continued)

FOREIGN PATENT DOCUMENTS

AU    2011226951 A1    6/2012
CN    101234435 A      8/2008
(Continued)

OTHER PUBLICATIONS

Mar. 3, 2017 Office Action issued in Chinese Patent Application No. 201480018821.6.
(Continued)

*Primary Examiner* — Susan E. Hodges
(74) *Attorney, Agent, or Firm* — Oliff PLC

(57) ABSTRACT

A method of inspecting an object including locating an object on a machine vision apparatus, attaching a light panel to the object to backlight a region of the object, obtaining an image of the region when backlit by the light panel and identifying a geometric property of the object from the image.

44 Claims, 7 Drawing Sheets

(51) Int. Cl.
*F21V 7/04* (2006.01)
*G01B 11/00* (2006.01)
*G01B 11/24* (2006.01)
*H04N 5/225* (2006.01)

(58) Field of Classification Search
USPC .......................................................... 348/125
See application file for complete search history.

(56) References Cited

U.S. PATENT DOCUMENTS

| | | | |
|---|---|---|---|
| 6,341,878 B1 | 1/2002 | Chiang | |
| 7,048,413 B2 | 5/2006 | Fan | |
| 7,430,050 B2 * | 9/2008 | Kamiyama | G01B 11/2433 356/625 |
| 7,626,208 B2 * | 12/2009 | Yang | H05K 1/0203 257/88 |
| 8,152,151 B2 | 4/2012 | Sandmeier | |
| 8,624,483 B2 | 1/2014 | Knapp et al. | |
| 8,830,288 B2 | 9/2014 | Shimomura | |
| 2004/0105094 A1 | 6/2004 | Breider | |
| 2004/0237973 A1 | 12/2004 | Noack | |
| 2011/0063426 A1 | 3/2011 | Dingle et al. | |
| 2011/0181715 A1 | 7/2011 | Eales | |

FOREIGN PATENT DOCUMENTS

| | | |
|---|---|---|
| CN | 100520375 C | 7/2009 |
| CN | 201800931 U | 4/2011 |
| CN | 201922266 U | 8/2011 |
| CN | 102498386 A | 6/2012 |
| DE | 100 48 925 A1 | 4/2002 |
| EP | 1 479 303 A2 | 11/2004 |
| EP | 1 605 228 A2 | 12/2005 |
| GB | 1 553 826 A | 10/1979 |
| GB | 2 287 092 A | 9/1995 |
| GB | 2 311 367 A | 9/1997 |
| JP | 2011-209032 A | 10/2011 |
| JP | 2012-98674 A | 5/2012 |
| WO | 94/01716 A1 | 1/1994 |
| WO | 2010/038009 A1 | 4/2010 |

OTHER PUBLICATIONS

"Phlox—High Luminosity Backlights," STEMMER Imaging, [http://www.stemmer-imaging.co.uk/en/products/line/Phlox.Backlight].
"Machine Vision Lighting," LUMITEX, Inc. [http://www.lumitex.com/machine_vision.html].
"Edge to Edge Backlights, NERLITE Machine Vision Lighting" Microscan [http://www.microscan.com/en-us/products/nerlite-machine-vision-lighting/edge-to-edge-backlights.aspx].
Jul. 31, 2013 Search Report issued in British Application No. 1302018.5.
Apr. 15, 2014 International Search Report issued in International Application No. PCT/GB2014/050286.
Apr. 15, 2014 Written Opinion of the International Searching Authority issued in International Application No. PCT/GB2014/050286.
Jan. 9, 2018 Office Action issued in Japanese Application No. 2015-556565.
Jan. 19, 2018 Office Action issued in Chinese Application No. 201480018821.6.
Aug. 13, 2018 Office Action issued in European Patent Application No. 14 702 941.7.
Sep. 30, 2018 Office Action issued in Chinese Application No. 201480018821.6.

* cited by examiner

METHOD AND APPARATUS FOR ILLUMINATION AND INSPECTION OF AN OBJECT IN A MACHINE VISION APPARATUS

FIELD OF INVENTION

This invention concerns a method and apparatus for use in machine vision. The invention has particular, but not exclusive, application to detecting an edge profile of an object through imaging of the object.

BACKGROUND

US2011/0181715 A1 describes a back-lit vision machine comprising a planar backlight located in a base of a coordinate measuring machine (CMM) for illuminating objects placed on the base. Backlit images are acquired by a CCD camera, these images processed by a computer to measure the location of edges of the object. Backlighting of non-planar parts facilitates the identification of the edges of an object.

For simple objects such apparatus detects edges of the object with the required accuracy. However, it has been found that for complex objects, such as objects comprising a series of overlapping walls or non-planar parts that cannot be uniformly illuminated by the backlight located in the base, edges of the object are not detected with the required accuracy.

WO94/01716 discloses a light emitting panel assembly that may be used as backlighting in a camera system used in inspection.

Stemmer Imaging Ltd provides Phlox® High Bright LED backlight panels suitable for use in machine vision situations.

SUMMARY OF INVENTION

According to a first aspect of the invention there is provided a method of inspecting an object comprising locating an object on a machine vision apparatus, attaching a light panel to the object to backlight a region of the object, obtaining an image of the region when backlit by the light panel and identifying a geometric property of the object from the image.

In this way, the region of the object may be illuminated sufficiently in order that geometric properties, such as edges of the object, in this region can be accurately detected from the image. In particular, the light panel can be attached to the object to uniformly illuminate regions of the object which cannot be uniformly illuminated from below or by using lights, such as light boxes, mounted remote from the object. For example, it may not be possible to illuminate an object having features that face in significantly different directions using a single light box. The use of multiple light boxes generates gaps that may hinder the identification of the geometric properties, such as the edges of the object. The light panel of the invention when attached to the object may have a shape that substantially corresponds to a shape of the region backlit by the light panel. In this way, substantially uniform, and possibly continuous, backlighting may be achieved across the region of the object to be imaged.

The light panel may comprise a flexible light panel that can be bent into a desired shape, such as a shape that substantially corresponds to a shape of the region backlit by the light panel. Attaching of the light panel to the object may bend the light panel into the desired shape. The light panel may be electroluminescent sheeting. It has been found that electroluminescent sheeting provides a uniformity of light that aids detection of geometric properties of the region.

The light panel may be attached to the object using a fixture. The fixture may also attach the object in place in the machine vision apparatus. The fixture may hold the light in the desired shape. The fixture may be arranged such that attachment of the light panel to the object using the fixture results in the light panel being shaped to follow contours of the object, thus providing a suitable shaped light panel to provide uniform illumination over the region to be illuminated.

The fixture may comprise a mounting to which the light panel can be releasably attached. For example, the mounting may be integrated into the fixture in such a manner that the mounting is intended to remain part of the fixture during normal use. This may allow the light panel to be replaced, when required.

The fixture may comprise a means for supplying power to the light panel attached thereto. The means may be a power supply. Alternatively, the means may be electrical connections for connecting to a power supply.

The fixture may comprise mounting formations for repeatably mounting the fixture to the object at a location defined by the formations. The location on the object may be defined in 6 degrees of freedom. The method may comprise repeatably mounting the fixture on the same or mounting the fixture on each of a set of nominally identical objects using the mounting formations, and inspecting the or each object when the fixture bearing the light panel is mounted thereon. In this way, each image is obtained under comparable conditions.

The fixture may be arranged to attach the light panel to the object such that the light panel is spaced from the object, for example, a distance that is the order of millimetres, such as about 5,6,7,8,9,10 or more millimetres. This may ensure that the light panel remains out of focus when obtaining an image of the object such that dust settled on the light panel is not mistaken as an edge of the object.

The method may comprise locating the or each of a set of nominally identical objects to the machine vision apparatus using the fixture. The method may comprise attaching the lighting panel to each of a set of nominally identical objects, wherein the lighting panel is attached at approximately the same position on each object. The fixture may comprise further mounting formations for mounting the object on the machine vision apparatus in a repeatable manner at a location defined by the mounting formations. The location on the machine vision apparatus may be defined in six degrees of freedom. The method may comprise repeatably locating the same or locating each of a set of nominally identical objects to the machine vision apparatus using the mounting formations on the fixture, and inspecting the or each object when the or each object is located at the defined location on the machine vision apparatus. In this way, each image is obtained under comparable conditions.

The and/or the further mounting formations may comprise a kinematic mount to define the location on the object/machine vision apparatus.

The light panel may be attached to the object so as to be located within the object. In this way, the light panel may illuminate a region that would otherwise fall within a shadow cast by the object if the object was backlit by a light located externally to the object.

It will be understood that the region of the object that is illuminated may be a region that would otherwise fall within the umbra or penumbra of a shadow cast by the object if the object was backlit by a light located externally to the object.

According to a second aspect of the invention there is provided a lighting unit for illuminating an object in a machine vision apparatus comprising a light panel and a fixture for attaching the light panel to the object such that the light panel backlights the object from a point of view of a camera of the machine vision apparatus.

The fixture may comprise a mount to which the light panel can be releasably attached, the mount arranged such that, when the light panel is attached thereto and the fixture attaches the light panel to the object, the light panel backlights the object from a point of view of a camera of the machine vision apparatus.

The fixture may be arranged to locate the light panel within the object to illuminate a region of the object that would otherwise fall within a shadow cast by the object if the object was backlit by a light located externally to the object.

The light panel may be a flexible panel that can be bent into a desired shape. For example, the light panel may be flexible to the extent that the light panel can be bent into a shape that follows a contour of a region of the object to be backlit. The fixture may be arranged to hold the flexible light panel bent into the desired shape when the light panel is attached to the object using the fixture.

The fixture may comprise mounting formations for repeatably mounting the fixture to the object at a location defined by the formations. The location on the object may be defined in 6 degrees of freedom.

Additionally or alternatively, the fixture may comprise further mounting formations for mounting the object on the machine vision apparatus. The further mounting formations may be arranged for repeatably mounting the object at a location on the machine vision apparatus defined by the further mounting formations. The location on the machine vision apparatus may be defined in six degrees of freedom. The machine vision apparatus may comprise a coordinate positioning machine and the further mounting formations may be arranged for repeatably mounting the object to a bed of the coordinate positioning machine.

The and/or further mounting formations may comprise a kinematic mount to define the location on the object/machine vision apparatus.

The fixture may comprise a power supply for the light panel. The fixture may comprise connections for connecting the light panel to a power supply.

The light panel may be an electroluminescent sheet. Alternatively, the light panel may be a string of LEDs, such as the light string as described in U.S. Pat. No. 7,048,413, which is incorporated herein by reference, and sold as LED Neon Flex™. The string of LEDs may be contained in a scattering body for scattering the light emitted by the LEDs. A cladding may enclose the scattering body and the string of LEDs, the cladding having an arcuate top face for emission of light emitted by the LEDs.

According to a third aspect of the invention there is provided a fixture for attaching a light panel to an object located in a machine vision apparatus, the fixture comprising a mount to which a light panel can be attached, the mount arranged such that when the light panel is attached thereto and the fixture attached to the object located in the machine vision apparatus, the light panel backlights the object from a point of view of a camera of the machine vision apparatus.

According to a fourth aspect of the invention there is provided a machine vision apparatus in combination with an object to be scanned using the machine vision apparatus, comprising a light panel attached to the object to backlight a region of the object from a point of view of a camera of the machine vision apparatus.

The region may be a region that would otherwise fall within a shadow cast by the object if the object was backlit by a light located externally to the object.

The light panel may be a flexible light panel that is attached to the object in a bent shape.

According to a fifth aspect of the invention there is provided a method of inspecting an object comprising locating an object on a machine vision apparatus, locating a light panel within the object to backlight a region of the object, obtaining an image of the region when backlit by the light panel and identifying a geometric property of the object from the image.

According to a sixth aspect of the invention there is provided a machine vision apparatus in combination with an object to be scanned using the machine vision apparatus, comprising a light panel located within the object to backlight a region of the object.

According to a further aspect of the invention there is provided a method of inspecting an object comprising locating an object in a machine vision apparatus, fixing a flexible light panel in the machine vision apparatus such that the flexible light panel is held bent in a required configuration for backlighting a region of the object, obtaining an image of the region when backlit by the flexible light panel and identifying a geometric property of the object from the image.

The flexible light panel may be held in a bent shape that substantially corresponds to a shape of the region of the object to be backlit.

The flexible light panel may be fixed in the bent shape through attachment to the object and/or to a bed of the machine vision apparatus.

According to another aspect of the invention there is provided a lighting unit for illuminating an object in a machine vision apparatus comprising a flexible light panel and a fixture for fixing the flexible light panel in the machine vision apparatus such that the flexible light panel is held bent in a required configuration for backlighting a region of the object from a point of view of a camera of the machine vision apparatus.

According to yet another aspect of the invention there is provided a machine vision apparatus in combination with an object to be scanned using the machine vision apparatus, comprising a flexible light panel fixed in the machine vision apparatus such that the flexible light panel is held bent in a required configuration for backlighting a region of the object from a point of view of a camera of the machine vision apparatus.

DESCRIPTION OF EMBODIMENTS

Figure 1:
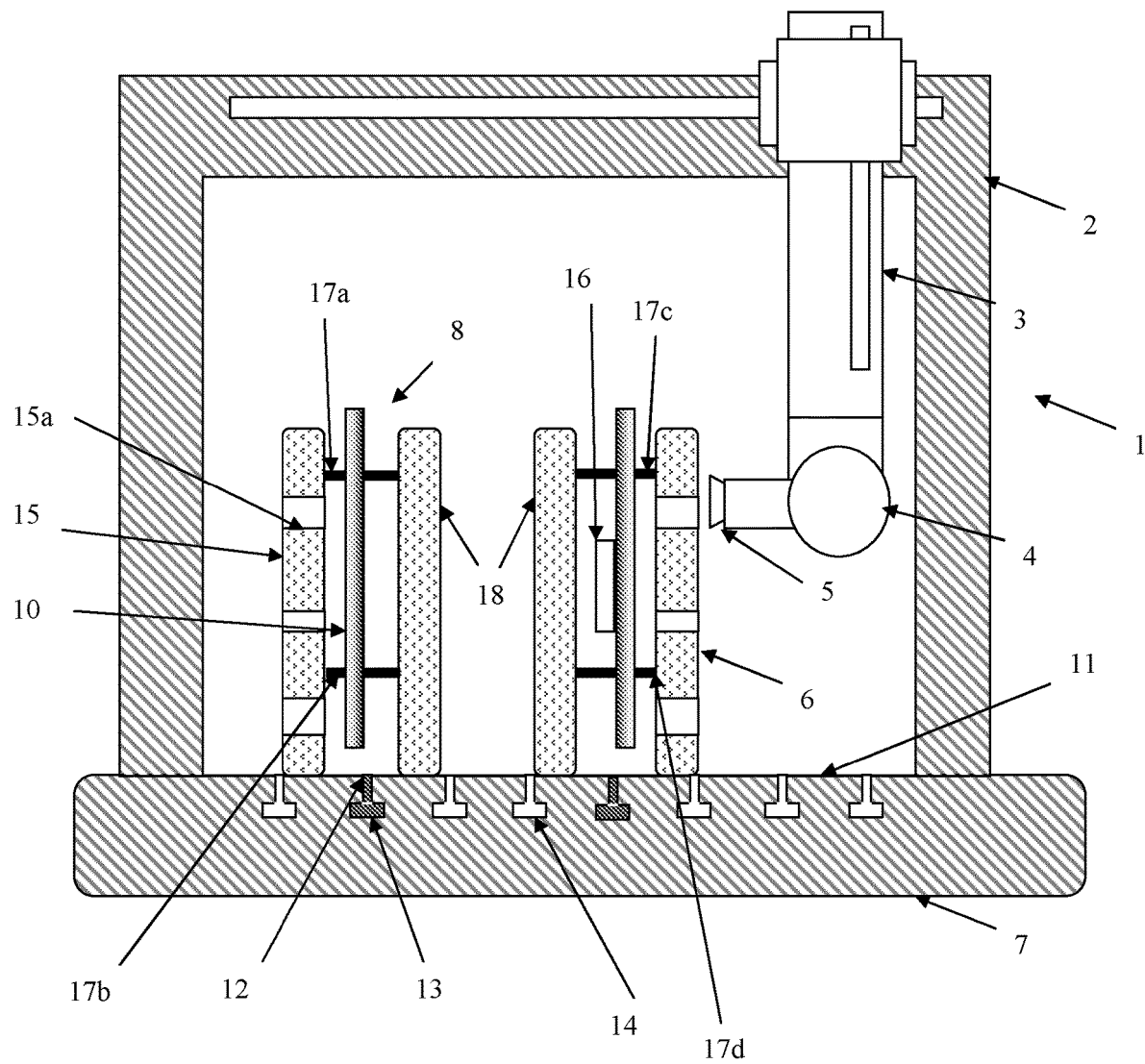
FIG. 1 is a schematic cross-sectional view of a machine vision apparatus according to one embodiment of the invention scanning an aircraft engine combustor.
Figure 2:
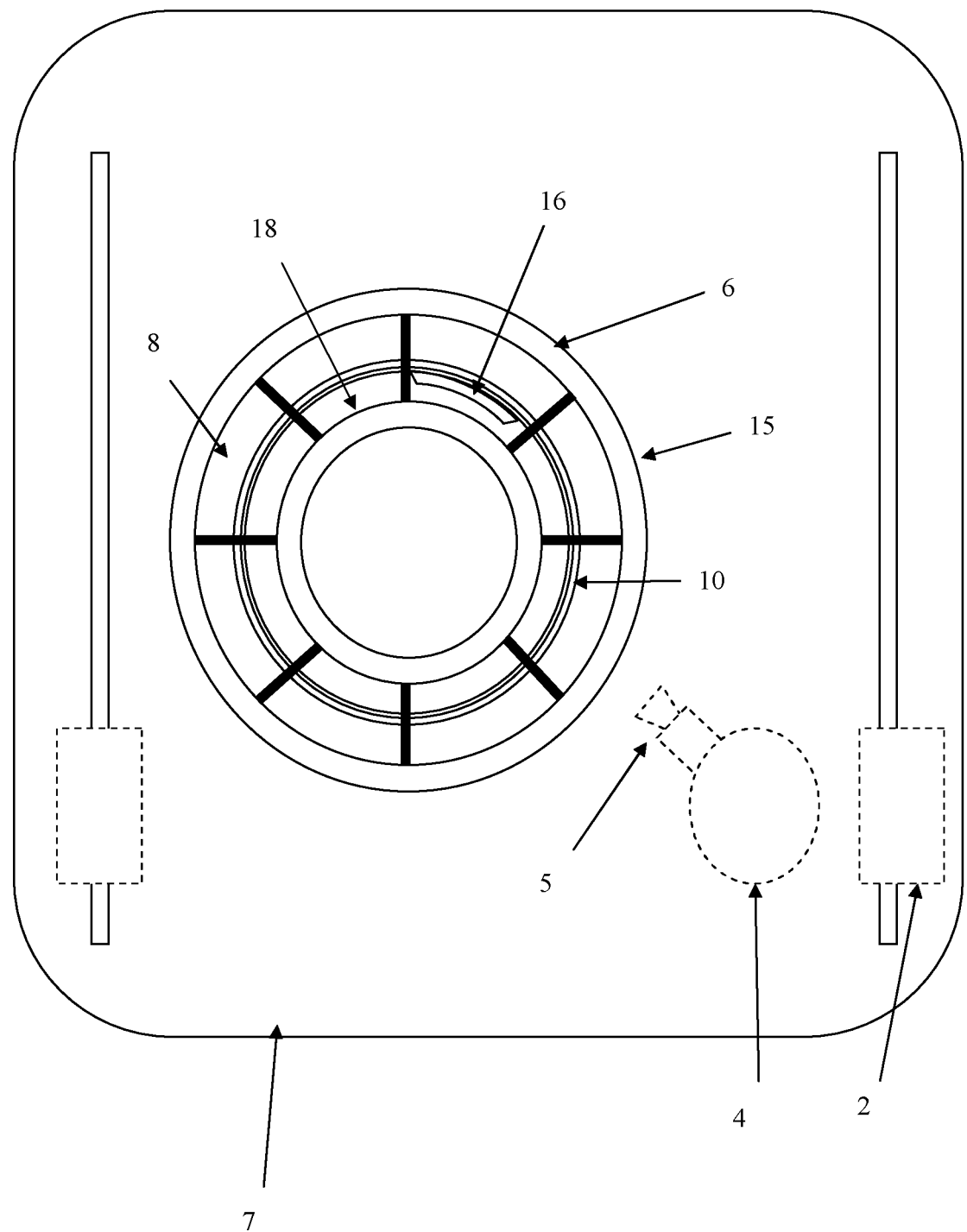
FIG. 2 is a schematic plan view of the machine vision apparatus shown in FIG. 1.

Referring to the Figures, a machine vision apparatus 1 is a bridge-type (Cartesian) coordinate measuring machine comprises arms 2 for supporting a quill 3, the arms 2 mounted on a base, such as a solid, granite base 7. The base 7 provides a bed 11 on which object 6 can be located. Mounted to the end of the quill 3 is a rotary head 4 carrying a camera 5, in this embodiment a CCD camera. It is also possible to use a CMOS image sensor. The quill 3 can be moved around the object 6 with the rotary head 4 adjusting the position of the camera 5 in order to capture images of the object.

The object 6 is located on the base 7. A fixture 8 attaches one or more light panels, such as one or more electroluminescent sheets 10, to the object 6 via a plurality of connecting members, four of which are shown as 17*a*, 17*b*, 17*c* and 17*d* The fixture 8 and the light panel 10 together form a lighting unit.

Figure 3:
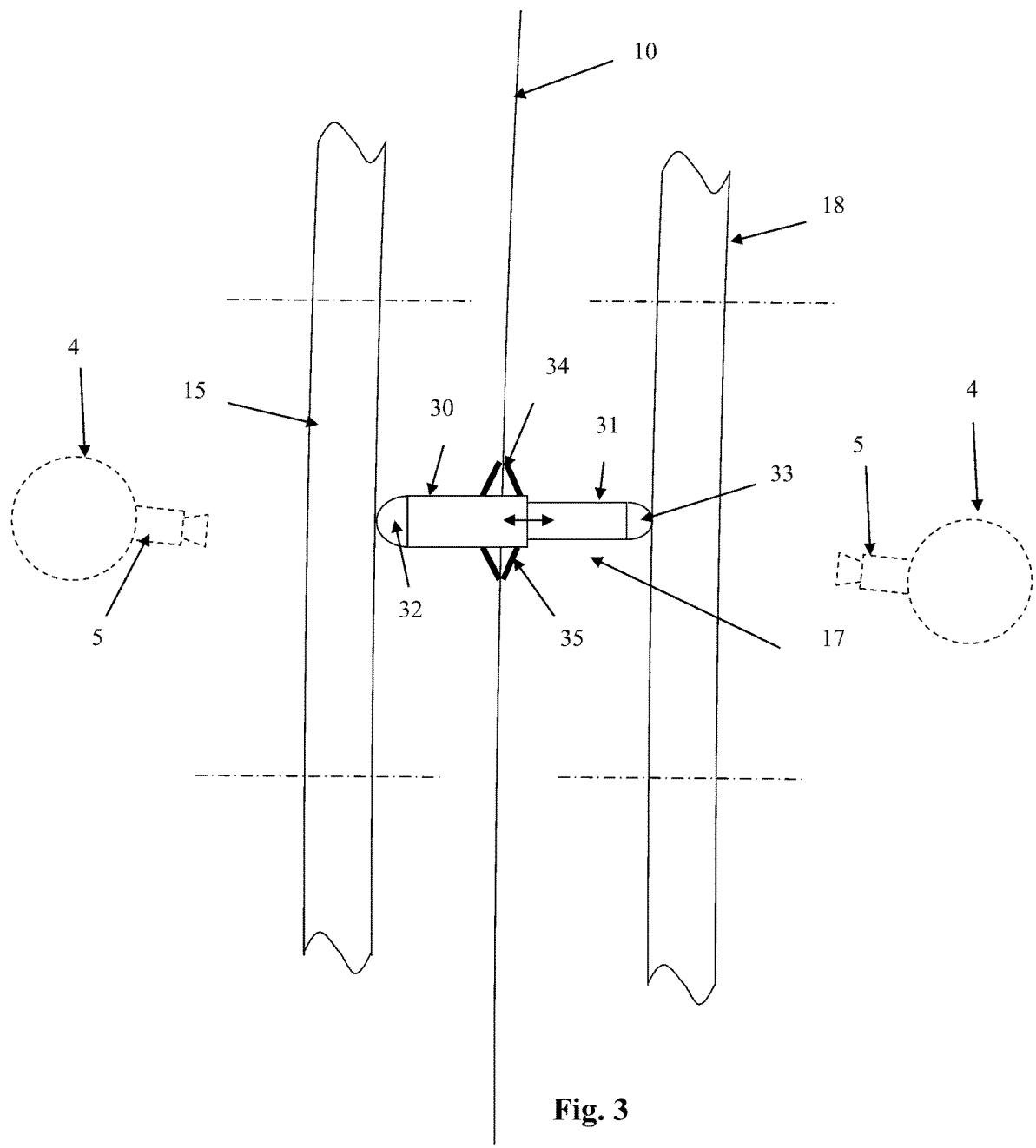
FIG. 3 is a plan view of a connecting member for attaching a lighting panel to an object in accordance with one embodiment of the invention.

Referring to FIG. 3, each connecting member 17*a*, 17*b*, 17*c*, 17*d* comprises a first member 30 that is slidably connected with second member 31 such that the length of the connecting member 17 can be adjusted. In this embodiment, the first and second members 30, 31 comprise tubular members that connect in a telescopic manner. A spring or like element (not shown) biases the members 30, 31 apart such that the connecting member 17 can be located within the object 6 between two walls 15, 18 of the object and is held in place by the biasing pushing ends 32, 33 of the connecting member against the walls 15, 18. The ends 32, 33 comprise a compliant material, for example rubber, to grip the walls 15, 18 and to prevent engagement of the connecting member 17 with the object 6 damaging the object 6. The larger diameter tubular member 30 comprises resilient grips 34, 35 in the form of a pair of resilient rings that are angled towards each other to engage at their outer peripheries. Edges of light panels 10 are inserted between the grips 34, 35 such that the light panels can be held in place on the object by the connecting members 17.

When attached to the object 6 the light panel(s) 10 is/are bent into a shape that substantially corresponds to a shape of at least a region of the object 6 to be imaged. In this embodiment, the light panel 10 follows the curvature of an external wall 15 of the object 6 and is spaced approximately the same distance from the external wall 15 along the region to be illuminated (in this embodiment, along the entire length of the external wall 15).

The light panel 10 comprises electrical connections (not shown) for connecting the light panel 10 to a power source, such as a battery pack 16.

In use, an image is obtained using the CCD camera 5 of a region of the object 6 by locating the object 6 on the table 11 of the CMM and attaching a light panel 10 bent into the required shape to the object 6 such that the light panel 10 is located within the object 6. In this position, the light panel 10 can backlight the external wall 15 of the object 6, which otherwise would fall within a shadow cast by the object 6 if the object was backlit by a light located externally to the object 6, i.e. outside the external wall 15. The CCD camera 5 is then moved around the outside of the object 6 whilst capturing images of the external wall 15 whilst it is backlit by the light panel 10. These images can then be passed to appropriate software, which is known in the art, to identify edges, such as edges 15*a*, of the object 6.

Use of this method may increase the accuracy in which edges of the object 6 are detected as the edges to be identified by the software are less likely to be obscured by shadows cast by the object 6.

Figure 4:
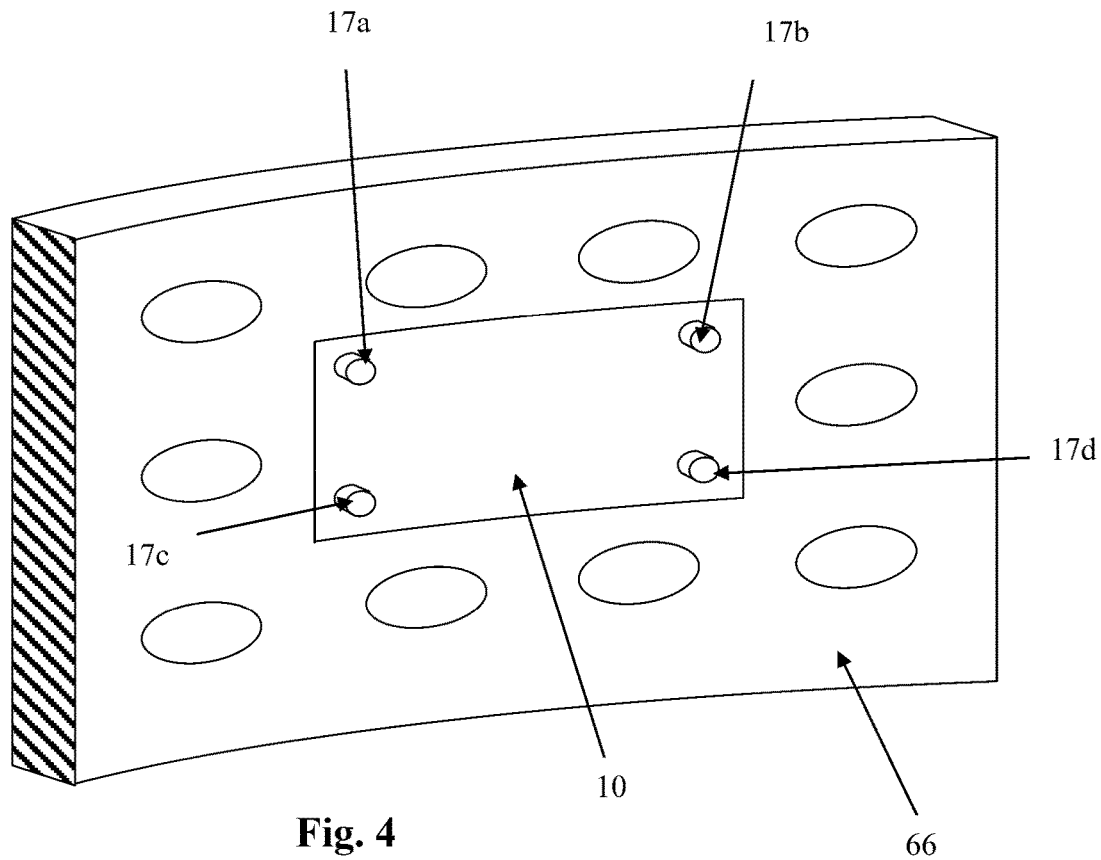
FIG. 4 is a perspective view of a connecting member for attaching a lighting panel to an object in accordance with another embodiment of the invention.
Figure 5:
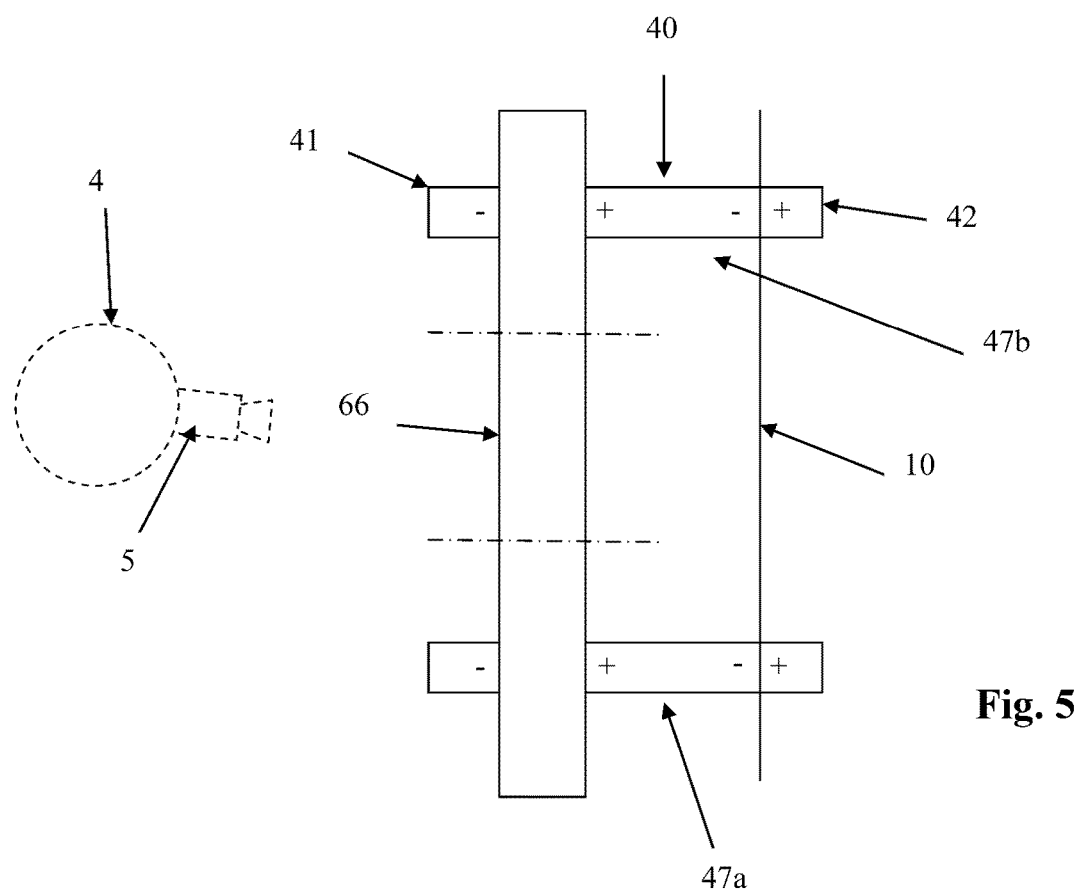
FIG. 5 is a plan view of the connecting member shown in FIG. 4.

FIGS. 4 and 5 show an alternative connecting member that may be used to attach the lighting panel 10 to an object 66 in the machine vision apparatus described above. In this embodiment, each connecting member 47 comprises three magnetic members 40, 41, and 42. A central magnetic member 40 is located between two outer magnetic members 41 and 42 with the lighting panel 10 located between members 40 and 42 and the object located between members 40 and 41 The magnetic attraction between the magnetic members 40, 41 and 42 hold the lighting panel 10 in place on the object 6. The connecting member 47 is suitable for situations where there are not two adjacent walls between which a connecting member can be attached. In the embodiment shown, four connecting members 47*a*, 47*b*, 47*c* and 47*d* hold the lighting panel 10 in place on the object 66. However, it will be understood it may not be necessary to hold the lighting panel 10 at the bottom and the lighting panel 10 may simple be allowed to hang loose.

Figure 6:
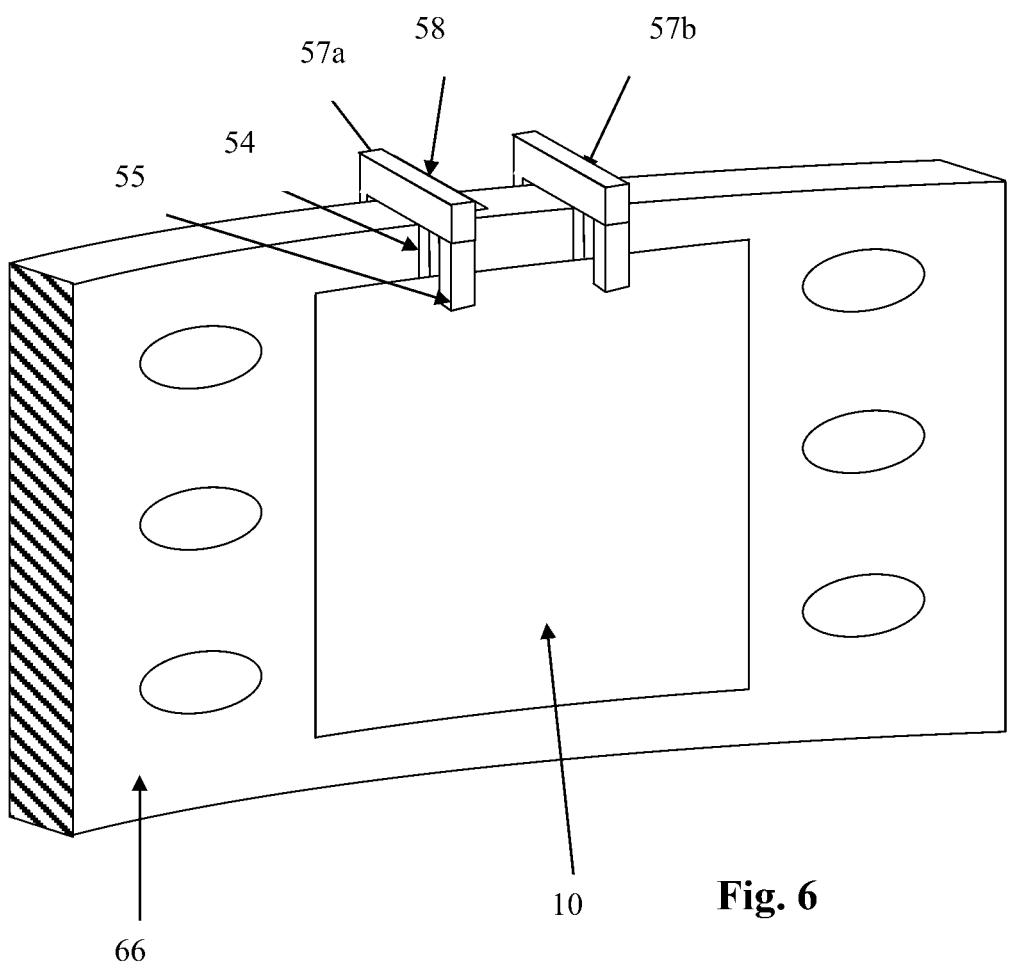
FIG. 6 is a perspective view of a connecting member for attaching a lighting panel to an object in accordance with yet another embodiment of the invention.

Referring now to FIG. 6, a further connecting member 57 is shown. This connecting member 57 comprises a hook shaped body 58 connected to resilient grip elements 54 and 55. The lighting panel 10 is pushed into the gap between the resilient grip elements 54, 55, the resilience of the elements holding the lighting panel 10 in place. It will be understood that other means for gripping the lighting panel could be used. For example, the gripping elements 54 and 55 may be relatively stiff elements that are biased towards each other by a spring or the like or the elements themselves may provide the biasing force, for example the elements could be a U-shaped metal clip, the ends of which are biased together by the resilience of the clip.

Figure 7:
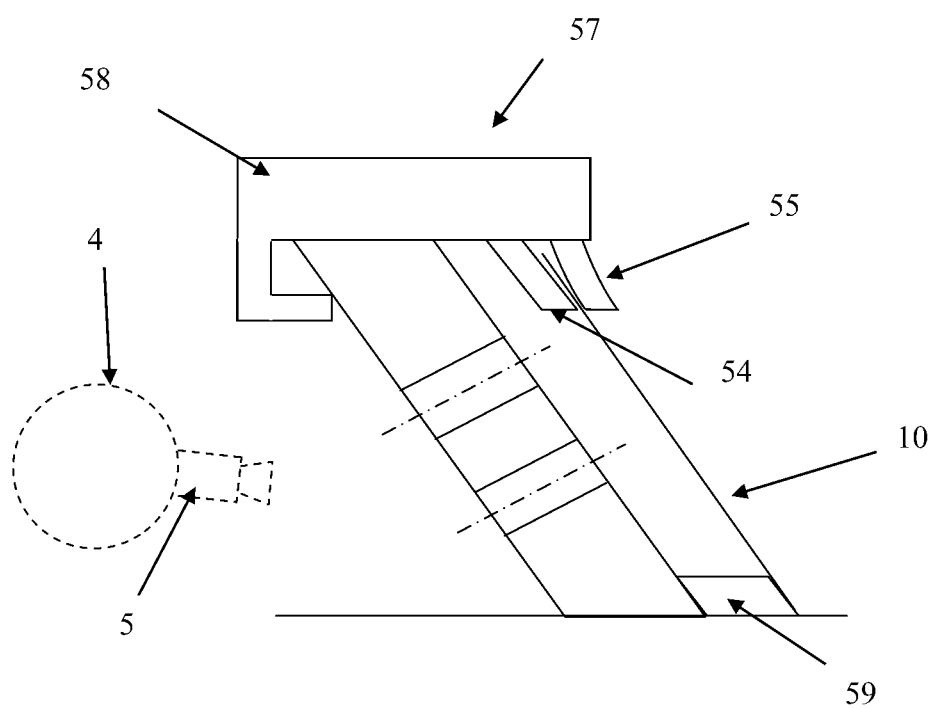
FIG. 7 is a cross-sectional view of the connecting member shown in FIG. 6 connected to an object with a wall at an oblique angle to the vertical.

To attach the lighting panel 10 in place on the object 66, the lighting panel 10 is attached in the connecting members 57*a*, and 57*b* and the hook shaped body 58 of each member 57*a*, 57*b* hooked over the top of the object 66. In FIG. 6, the lighting panel 10 is shown illuminating an object 66 with a vertical wall, the lighting panel 10 hanging from the connecting members 57*a* and 57*b*. However, for an object with non-vertical walls, such as that shown in FIG. 7, it may be necessary to provide a spacer 59 for maintaining the required spacing between the wall 75 and the lighting panel 10. A spacer may also be used with the connecting member shown in FIGS. 4 and 5, if the lighting panel is allowed to hang loose at the bottom.

Figure 8:
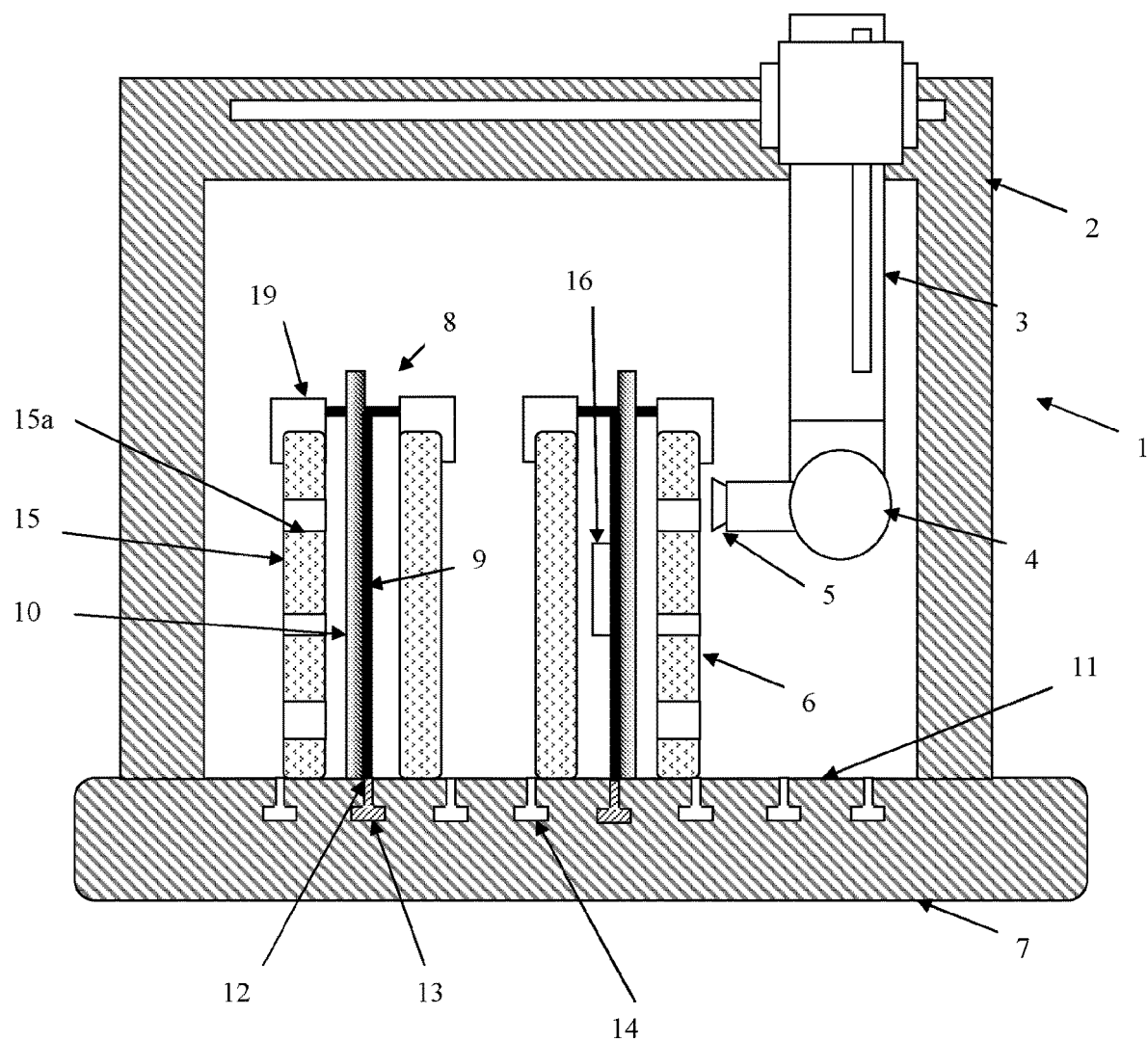
FIG. 8 is a schematic cross-sectional view of a machine vision apparatus according to another embodiment of the invention scanning an aircraft engine combustor.

FIG. 8 shows another embodiment of the invention wherein a fixture 8 comprises connecting members 19 attached to a support 9 that bears the lighting panel 10. Connecting members connect the lighting panel 10 via the support 9 to the object 6. A length of each connecting members 19 may be adjustable to clamp the connecting member 19 in place on walls 15, 18 of the object 6. In one embodiment, cooperating formations on the object and formations on the connecting members allow for a kinematic mounting of the connecting members to the object 6. The bottom of the support 9 has a mounting formation 12 that can cooperate with one or more inserts 13 received in slots 14 in the bed 11 of the machine vision apparatus for attaching the support 9 in place on the bed 11. The mounting formation and insert 12, 13 may be of the type described in WO2010/038009, wherein the support member 9, rather than a tool setter, can be kinematically mounted to the insert 13 located in the slots 14.

Figure 9:
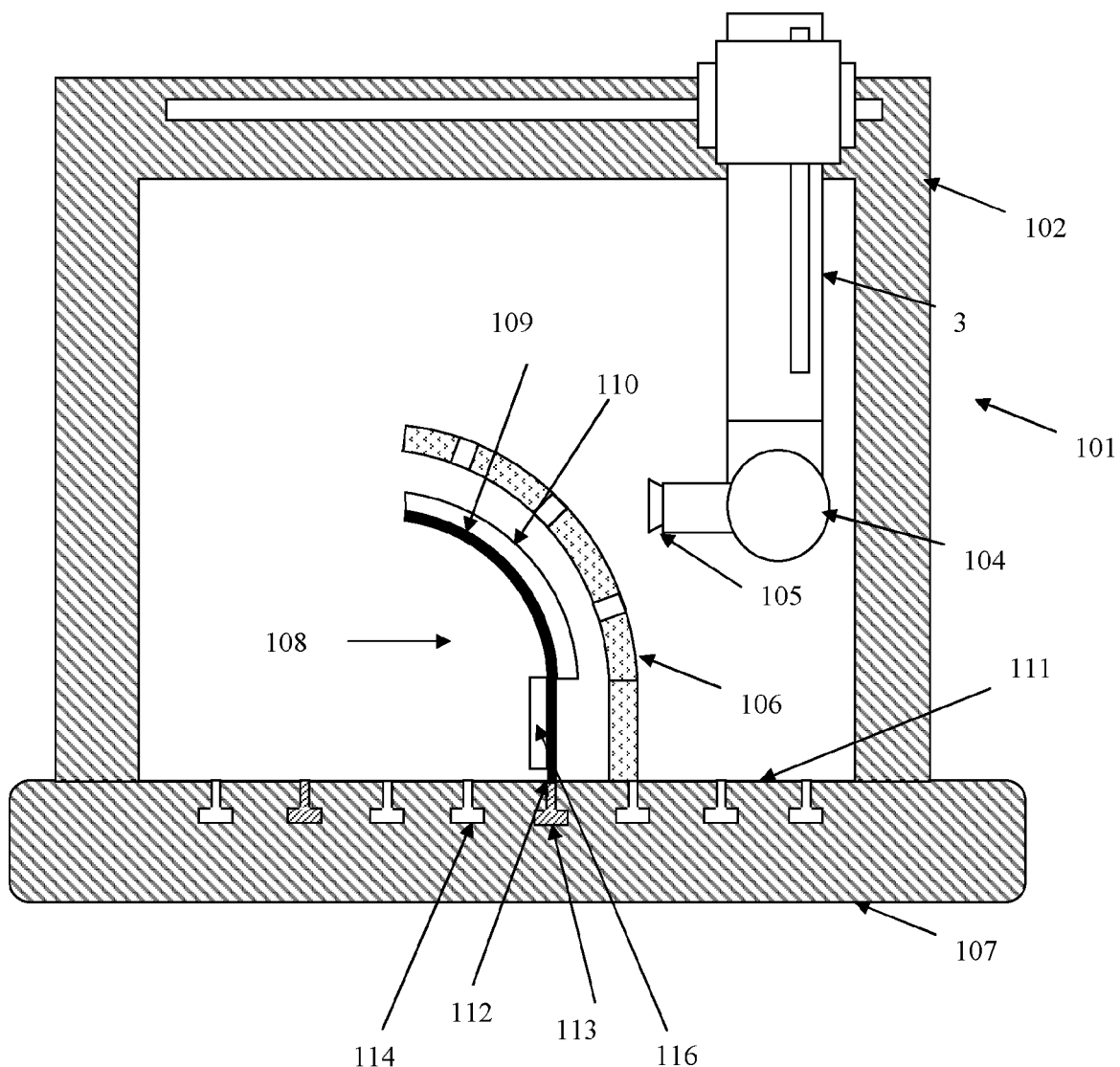
FIG. 9 is a schematic cross-sectional view of a machine vision apparatus according to another embodiment of the invention.

Referring to FIG. 9, a further embodiment is shown in which a flexible light panel 110 backlights a curved region of object 106. Like reference numerals but in the series 100 have been used to identify features of this embodiment that are the same or similar to features of the previously described embodiments.

The flexible light panel 110 is bent into the required shape and attached to support 109 of fixture 108 such that it is held in the bent shape. The light panel 110 is attached to the support 109 by suitable fixing devices (not shown), such as magnetic fixing devices. To locate the bent light panel in the machine vision apparatus, the fixture 108 is attached to the base 107 of the machine vision apparatus, in the manner hereinbefore described with reference to previous embodiments, and is not attached to the object 106. The light panel 110 is located such that it backlights the object 106 in a manner suitable for measurement. Such an arrangement may be appropriate when the shape of the object makes it inappropriate to attach the light panel to the object.

It will be understood that modifications and alterations can be made to the described embodiment without departing from the scope of the invention as defined herein. For example, the light panel may be integrally connected with the fixture. The invention is not limited to the light panel being located within the object but may also include attaching a light panel to the object such that the light panel is located outside of the object. Such an arrangement may have advantages when the object has a complex shape that cannot be illuminated adequately with a light source mounted remote from the machine vision apparatus.

The invention claimed is:

1. A method of inspecting an object, the method comprising:
    locating an object on a machine vision apparatus;
    attaching a light panel to the object to backlight a region of the object;
    obtaining an image of the region backlit by the light panel; and
    identifying a geometric property of the object from the image.

2. A method according to claim 1, wherein the light panel, attached to the object, has a shape that substantially corresponds to a shape of the region backlit by the light panel.

3. A method according to claim 1, wherein the light panel comprises a flexible light panel that is capable of being bent into a desired shape.

4. A method according to claim 3, wherein attaching the light panel to the object bends the light panel into the desired shape.

5. A method according to claim 1, wherein the light panel comprises electroluminescent sheeting.

6. A method according to claim 1, comprising attaching the light panel to the object using a fixture.

7. A method according to claim 6, wherein the fixture comprises a mounting to which the light panel is releasably attached.

8. A method according to claim 7, wherein the fixture comprises a means for supplying power to the light panel attached thereto.

9. A method according to claim 8, wherein the fixture comprises a power supply.

10. A method according to claim 6, further comprising:
    repeatably mounting the fixture on each of a set of nominally identical objects using mounting formations, the mounting formations providing for repeatable mounting of the fixture to each of the nominally identical objects at a location defined by the formations, and
    inspecting each of the nominally identical objects backlit by the light panel mounted thereon using the fixture.

11. A method according to claim 6, further comprising locating each of a set of nominally identical objects on the machine vision apparatus using the fixture.

12. A method according to claim 11, wherein:
    the fixture comprises further mounting formations for mounting a said object on the machine vision apparatus in a repeatable manner at a defined location defined by the further mounting formations, and
    the method further comprises using the fixture to repeatably mount each object of the set of nominally identical objects at the defined location and inspecting each object located at the defined location on the machine vision apparatus.

13. A method according to claim 10, wherein the mounting formations comprise a kinematic mount that defines the defined location on the object.

14. A method according to claim 1, wherein the light panel is attached to the object to locate the light panel within the object.

15. A method according to claim 14, wherein the region that is illuminated by the backlight includes a region that would otherwise fall within a shadow cast by the object if the object was backlit by a light located externally to the object.

16. An image obtained using a method according to claim 1.

17. A lighting unit for illuminating an object in a machine vision apparatus, the lighting unit comprising:
    a light panel; and
    a fixture for attaching the light panel to the object to backlight the object from a point of view of a camera of the machine vision apparatus.

18. A lighting unit according to claim 17, wherein the fixture comprises a mount to which the light panel is releasably attachable.

19. A lighting unit according to claim 17, wherein the fixture is arranged to locate the light panel within the object to illuminate a region of the object that would otherwise fall within a shadow cast by the object if the object was backlit by a light located externally to the object.

20. A lighting unit according to claim 17, wherein the light panel is a flexible panel that is capable of being bent into a desired shape.

21. A lighting unit according to claim 20, wherein the fixture is arranged to attach the light panel to the object to hold the flexible light panel bent in the desired shape.

22. A lighting unit according to claim 17, wherein the fixture comprises mounting formations for repeatably mounting the fixture to the object at a location defined by the formations.

23. A lighting unit according to claim 17, wherein the fixture comprises further mounting formations for repeatably mounting the object on the machine vision apparatus at a location defined by the further mounting formations.

24. A lighting unit according to claim 23, wherein:
the machine vision apparatus comprises a coordinate positioning machine, and
the further mounting formations are arranged for repeatably mounting the object to a bed of the coordinate positioning machine.

25. A lighting unit according to claim 22, wherein the mounting formations comprise a kinematic mount to define the location on the object.

26. A lighting unit according to claim 17, wherein the fixture comprises a power supply for the light panel.

27. A lighting unit according to claim 17, wherein the fixture comprises connections for connecting the light panel to a power supply.

28. A lighting unit according to claim 17, wherein the light panel is an electroluminescent sheet.

29. A fixture for attaching a light panel to an object located in a machine vision apparatus, the fixture comprising:
a first mount to which the light panel is attachable; and
a second mount for attaching the fixture to the object located in the machine vision apparatus to backlight the object from a point of view of a camera of the machine vision apparatus with the light panel.

30. A machine vision apparatus in combination with an object to be scanned using the machine vision apparatus, comprising
a light panel attached to the object to backlight a region of the object from a point of view of a camera of the machine vision apparatus.

31. A machine vision apparatus according to claim 30, wherein the region is a region that would otherwise fall within a shadow cast by the object if the object was backlit by a light located externally to the object.

32. A machine vision apparatus according to claim 30, wherein the light panel is a flexible light panel that is attached to the object in a bent shape.

33. A method of inspecting an object, the method comprising:
locating an object in a machine vision apparatus;
fixing a flexible light panel in the machine vision apparatus to hold the flexible light panel bent in a required configuration for backlighting a region of the object;
obtaining an image of the region backlit by the flexible light panel; and
identifying a geometric property of the object from the image.

34. A method according to claim 33, wherein the flexible light panel is held in a bent shape that substantially corresponds to a shape of the region of the object to be backlit.

35. A method according to claim 34, wherein the flexible light panel is fixed in the bent shape through attachment to at least one of the object and a bed of the machine vision apparatus.

36. A lighting unit for illuminating an object in a machine vision apparatus, the lighting unit comprising:
a flexible light panel; and
a fixture for fixing the flexible light panel in the machine vision apparatus to hold the flexible light panel bent in a required configuration for backlighting a region of the object from a point of view of a camera of the machine vision apparatus.

37. A machine vision apparatus in combination with an object to be scanned using the machine vision apparatus, comprising
a flexible light panel fixed in the machine vision apparatus to hold the flexible light panel bent in a required configuration for backlighting a region of the object from a point of view of a camera of the machine vision apparatus.

38. A method according to claim 12, wherein the further mounting formations comprise a kinematic mount that defines the location on the machine vision apparatus.

39. A method according to claim 6, further comprising:
repeatably mounting the fixture on the same object using mounting formations, the mounting formations providing for repeatable mounting of the fixture to the object at a location defined by the formations, and
repeatedly inspecting the same object backlit by the light panel each time the light panel is mounted thereon using the fixture.

40. A method according to claim 39, wherein the mounting formations comprise a kinematic mount that defines the location on the object.

41. A method according to claim 6, further comprising locating the object on the machine vision apparatus using the fixture.

42. A method according to claim 41, wherein:
the fixture comprises further mounting formations for mounting the object on the machine vision apparatus in a repeatable manner at a defined location defined by the further mounting formations, and the method further comprises using the fixture to repeatably mount the same object at the defined location and inspecting the object each time the object is located at the defined location on the machine vision apparatus.

43. A method according to claim 42, wherein the further mounting formations comprise a kinematic mount that defines the location on the machine vision apparatus.

44. A lighting unit according to claim 23, wherein the further mounting formations comprise a kinematic mount to define the location on the machine vision apparatus.

* * * * *